US010699321B2

(12) United States Patent
Krishnamurthy et al.

(10) Patent No.: US 10,699,321 B2
(45) Date of Patent: Jun. 30, 2020

(54) GLOBAL VECTOR RECOMMENDATIONS BASED ON IMPLICIT INTERACTION AND PROFILE DATA

(71) Applicant: Adobe Inc., San Jose, CA (US)

(72) Inventors: Balaji Krishnamurthy, Noida (IN); Nikaash Puri, New Delhi (IN)

(73) Assignee: Adobe Inc., San Jose, CA (US)

(*) Notice: Subject to any disclaimer, the term of this patent is extended or adjusted under 35 U.S.C. 154(b) by 302 days.

(21) Appl. No.: 15/785,934

(22) Filed: Oct. 17, 2017

(65) Prior Publication Data
US 2019/0114687 A1     Apr. 18, 2019

(51) Int. Cl.
*G06Q 30/00*     (2012.01)
*G06Q 30/06*     (2012.01)

(52) U.S. Cl.
CPC .............................. *G06Q 30/0631* (2013.01)

(58) Field of Classification Search
CPC ................................................. G06Q 30/0631
See application file for complete search history.

(56) References Cited

U.S. PATENT DOCUMENTS

| | | | | |
|---|---|---|---|---|
| 8,983,888 B2 * | 3/2015 | Nice | ........................ | G06N 5/02 706/45 |
| 9,535,897 B2 | 1/2017 | Anderson et al. | | |
| 9,691,035 B1 * | 6/2017 | Sandler | .............. | G06Q 30/0631 |
| 10,109,051 B1 * | 10/2018 | Natesh | ................. | G06K 9/4652 |
| 10,515,400 B2 | 12/2019 | Krishnamurthy et al. | | |
| 2007/0226207 A1 | 9/2007 | Tawde | | |
| 2012/0123895 A1 | 5/2012 | Horvitz | | |
| 2013/0139191 A1 | 5/2013 | Ren | | |
| 2017/0024645 A1 | 1/2017 | Socher et al. | | |
| 2018/0068371 A1 | 3/2018 | Krishnamurthy et al. | | |

OTHER PUBLICATIONS

Greg Linden et al. "Amazon.com Recommendations Item-to-Item Collaborative Filtering", IEEE Internet Computing, Jan./Feb. 2003, pp. 76-80. (Year: 2003).*

(Continued)

*Primary Examiner* — Naeem U Haq
(74) *Attorney, Agent, or Firm* — SBMC

(57) ABSTRACT

A digital medium environment is described to facilitate recommendations based on vectors generated using feature word embeddings. A recommendation system receives data that describes at least one attribute for a user profile, at least one item, and an interaction between the user profile and the at least one item. The recommendation system associates each user profile attribute, each item, and each interaction between a user profile and an item as a word, using natural language processing, and combines the words into sentences. The sentences are input to a word embedding model to determine feature vector representations describing relationships between the user profile attributes, items, and explicit and implicit interactions. From the feature vector representations, the recommendation system ascertains a similarity between different features. Thus, the recommendation system can provide customized recommendations based on implicit interactions, even for a user profile that is not associated with any historical interaction data.

20 Claims, 7 Drawing Sheets

(56) References Cited

OTHER PUBLICATIONS

Hrishikesh A. Teke "An Intelligent Recommendation System" Texas A&M University-Kingsville May 2018 (Year: 2018).*
"Non-Final Office Action", U.S. Appl. No. 15/259,832, dated May 9, 2019, 17 pages.
"Pre-Interview First Office Action", U.S. Appl. No. 15/259,832, dated May 21, 2019, 3 pages.
Collobert,"A unified architecture for natural language processing: Deep neural networks with multitask learning", Proceedings of the 25th international conference on Machine learning. ACM, 2008., Jul. 2008, 8 pages.
Harper,"The MovieLens Datasets: History and Context", ACM Transactions on Interactive Intelligent Systems (TiiS) 5, 4, Article 19, Dec. 2015, 20 pages.
Juan,"Field-aware Factorization Machines for CTR Prediction", Proceedings of the 10th ACM Conference on Recommender Systems, Sep. 2016, 8 pages.
Koren,"Matrix factorization techniques for recommender systems", In IEEE journal of Computer vol. 42, issue 8, Aug. 2009, pp. 42-49.
Krishnamurthy,"Learning Vector-Space Representations of Items for Recommendations using Word Embedding Models", Procedia Computer Science 80 (2016), Jun. 2016, 6 pages.
Mikolov,"Efficient estimation of word representations in vector space", arXiv preprint arXiv:1301.3781 (2013), Sep. 7, 2013, 12 pages.
Mnih,"A Scalable Hierarchical Distributed Language Model", Advances in neural information processing systems. 2009., 2009, 8 pages.
Pennington,"GloVe: Global Vectors forWord Representation", EMNLP. vol. 14. 2014., Sep. 2014, 12 pages.
Sarwar,"Item-Based Collaborative Filtering Recommendation Algorithms", In Proceedings of WWW10, Available at <http://citeseerx.ist.psu.edu/viewdoc/download;jsessionid=53CDC5DC7FF8F88183770CD0C72DD017?doi=10.1.1.167.7612&rep=rep1&type=pdf>, 2001, 11 pages.
Zhou,"Large-scale Parallel Collaborative Filtering for the Netflix Prize", Algorithmic Aspects in Information and Management, Jun. 2008, 12 pages.
"Restriction Requirement", U.S. Appl. No. 15/259,832, dated Feb. 5, 2019, 7 pages.
"Combined Search and Examination Report", GB Application No. 1810574.2, dated Dec. 11, 2018, 7 pages.
"Corrected Notice of Allowability", U.S. Appl. No. 15/259,832, dated Nov. 26, 2019, 5 pages.
"Notice of Allowance", U.S. Appl. No. 15/259,832, dated Oct. 29, 2019, 9 pages.
Nice,"Feature Embedding in Matrix Factorization", Microsoft U.S. Appl. No. 13/723,539, filed Dec. 21, 2019, 42 pages.
"Foreign Office Action", GB Application No. 1810574.2, dated Jan. 29, 2020, 7 pages.

* cited by examiner

GLOBAL VECTOR RECOMMENDATIONS BASED ON IMPLICIT INTERACTION AND PROFILE DATA

BACKGROUND

Computing devices output recommendations to expose items that are likely of interest to a user, even if the user is unaware of the items' existence. For instance, a video streaming service outputs movie or television show recommendations, an online store outputs product recommendations, and so forth. Many services have replaced conventional search engines with automatic recommendations as a primary means for discovering content items. Accordingly, systems strive to tailor recommendations to individual end users, such that recommended items are actually of interest.

Conventional recommendation systems leverage historical data describing explicit interactions between user profiles and items. Explicit interactions include item view-view relationships, which describe items that were viewed together in a single browsing session. Other explicit interactions include view-bought relationships, which describe at least one item that was purchased after being viewed. Alternatively or additionally, explicit interactions include item bought-bought relationships, which describe items that were purchased together in a single browsing session. Conventional approaches build models from this explicit interaction data and use these models to determine a recommendation for a user profile.

Conventional recommendation systems, however, are unable to generate recommendations for user profiles that do not have historic explicit interaction data. Similarly, conventional recommendation systems are unable to account for implicit interactions between user profiles and items. Implicit interactions refer to interactions that do not explicitly indicate affinity for certain items. For instance, implicit interactions may include a number of times an item was viewed, an amount of time spent reading a news article, a percentage of a video watched, and so forth. As a result, conventional approaches for digital recommendations fail to account for significant interaction data that would otherwise influence a recommendation decision. Accordingly, conventional approaches for automatic item recommendations are limited to considering only certain types of interaction data, which often results in outputting irrelevant recommendations.

SUMMARY

A digital medium environment is described to facilitate recommendations based on vectors generated using feature word embeddings. In one example, a computing device implementing a recommendation system receives data that describes at least one attribute for a user profile, at least one item, and an interaction between the user profile and the at least one item. Continuing this example, the recommendation system receives different sets of session data describing user profile attributes, items, and interactions between the user profile and the items over a certain period, e.g., over a single browsing session. After receiving the data, the recommendation system associates each user profile attribute, each item, and each interaction between a user profile and an item as a word, using natural language processing.

From these words, the recommendation system compiles words associated with a session into a sentence, such that the sentence includes information describing the user profile, items, and interactions between the user profile and items during the course of the session. Thus, the recommendation system generates a sentence that is representative of an individual session. Additionally, the recommendation system differentiates between explicit interactions and implicit interactions among user profiles and items by generating separate sentences describing explicit and implicit interactions for a single session. For instance, an explicit interaction refers to an express affinity between a user profile and an item, such as a rating assigned to the item by the user profile, an indication that the user profile purchased the item, and so forth. Conversely, an implicit interaction refers to interactions that do not directly correlate with an express affinity between a user profile and an item, such as a number of times the item was viewed, an amount of time spent interacting with the item, a percentage of the item that was consumed by the user profile, and so forth.

Each sentence generated by the recommendation system is subsequently input into a word embedding model to determine feature vector representations describing similarities between the user profile attributes, items, explicit interactions, and implicit interactions described in the received data. In some implementations, the word embedding model utilizes an objective function that includes data fields designed to account for implicit interactions between items and user profiles. Thus, the recommendation system generates feature vector representations that include information describing user profiles, items, and interactions in a common framework. From the feature vector representations, the recommendation system can ascertain a similarity between different features. For instance, the recommendation system can ascertain a similarity between a user profile attribute and an item based on their respective feature vector representations. In some implementations, feature similarity is determined based on a dot product of respective feature vectors.

The recommendation system generates a feature similarity matrix using the feature vector representations and stores both the feature similarity matrix and feature vector representations for use in generating recommendations. In this manner, when the recommendation system receives a request to access an item from a user profile, information describing the user profile can be used with the feature vector representations and feature similarity matrix to recommend an item having an affinity to the user profile. Thus, the recommendation system can provide customized recommendations even for a cold user profile that is not associated with any historical interaction data. Furthermore, the recommendation system can identify affinities between various features described in the feature similarity matrix with greater precision in comparison to conventional techniques due to the inclusion of implicit interaction data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
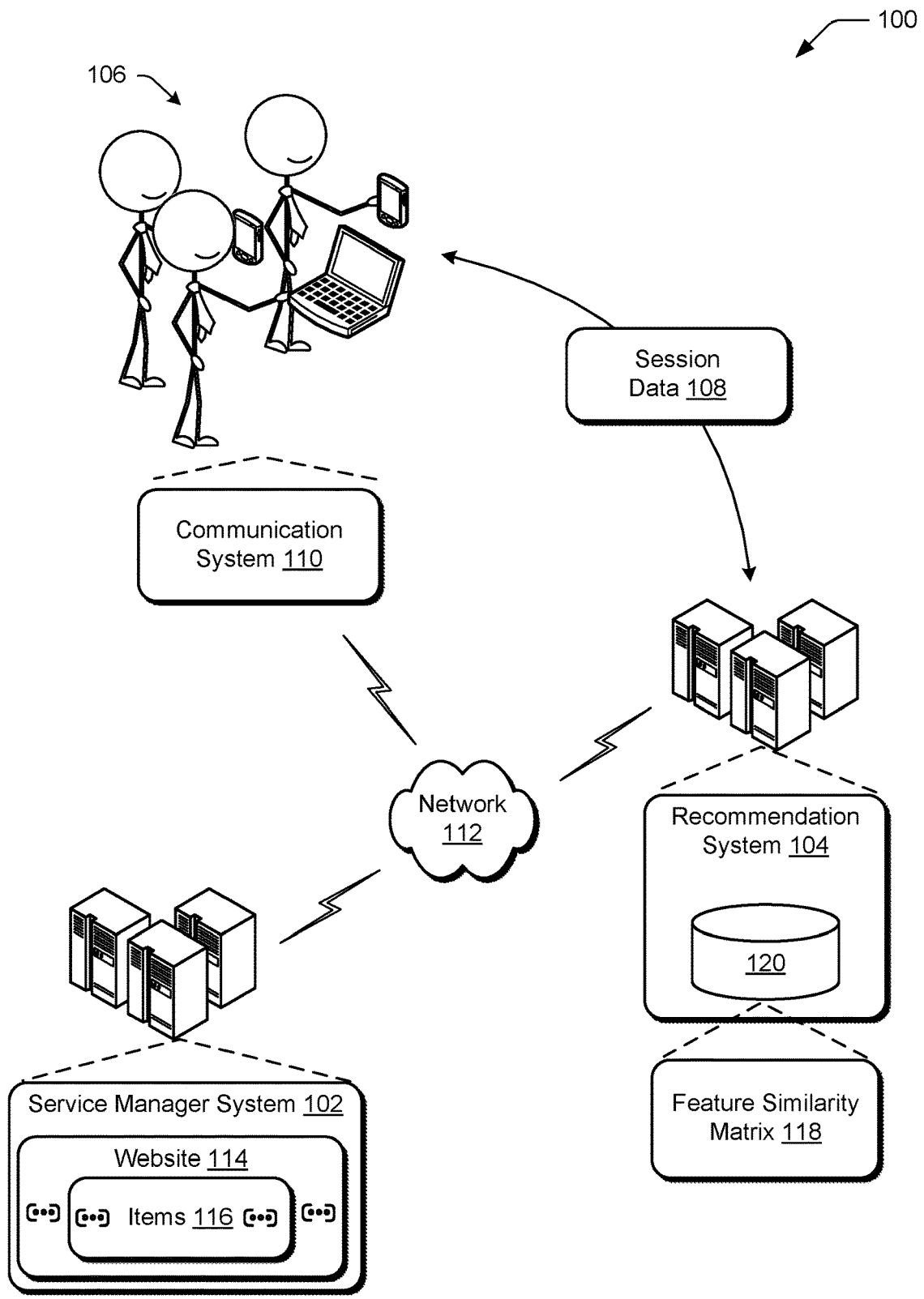
FIG. 1 is an illustration of an environment in an example implementation that is operable to employ global vector recommendations using the techniques described herein.

Techniques and systems are described herein that implement word embedding models by at least one computing device to determine vector representations of various features, such as user profile identifiers, user profile attributes, item identifiers, and interactions between user profiles and items. By generating vector representations that include information describing these disparate features in a common framework, the techniques described herein precisely identify similarities between different features as a function of respective vector representations.

The techniques described herein are advantageous over conventional approaches to generating recommendations in that they account for information describing user profiles, and both implicit and explicit interactions between user profiles and items. By contrast, conventional techniques merely generate recommendations based on item co-occurrence models and are unable to account for various user profile attributes or interaction data to customize recommendations. Thus, the techniques described herein can provide customized recommendations even for a cold user profile, which is not associated with any interaction data.

To ensure that recommendations are appropriately customized for a particular feature, a recommendation system models user profile behavior across a website as an ongoing conversation using natural language processing techniques. Thus, the recommendation system classifies data describing a user profile, an item, and interactions between the user profile and the item as words. These words are then combined into sentences, which are each representative of an individual session, such as a browsing session. Multiple sentences are then combined into a uniform behavior corpus for user profile interactions, which is used to generate vector representations for various features including user profiles, items, user profile attributes, and interaction data.

Feature vector representations are then used by the recommendation system to generate a feature similarity matrix that is useable to define relationships between features. For example, the recommendation system may generate the feature similarity matrix based on dot products of the respective feature vector representations. In this example, a high resulting value from the dot product corresponds to a high affinity between features, and vice versa. Thus, the techniques described herein are configured to utilize the feature similarity matrix to generate feature recommendations, such as a recommendation of an item having a high affinity to a user profile attribute.

In the following discussion, an example environment is described that may employ the techniques described herein. Example procedures are then described which may be performed in the example environment as well as other environments. Consequently, performance of the example procedures is not limited to the example environment and the example environment is not limited to performance of the example procedures.

Terms

The term "session" refers to a discrete period of time during which a user profile interacts with one or more items. For instance, a session may refer to a browsing session for a website that begins when a user profile accesses the website and ends when the user profile navigates away from the website. Alternatively or additionally, a session may be a time period without 30 minutes of inactivity in a shopping environment, a time period without 12 hours of inactivity for a streaming environment, and so forth.

The term "explicit interaction" refers to an express affinity between a user profile and an item. For instance an explicit interaction may describe a rating assigned to the item by the user profile, an indication that the user profile purchased the item, and so forth.

The term "implicit interaction" refers to an interaction that does not directly correlate with an express affinity between a user profile and an item. For example, an implicit interaction may describe a number of times the item was viewed, an amount of time spent interacting with the item, a percentage of the item that was consumed by the user profile, and so forth.

The term "word embedding model" refers to a mathematical model that is useable by a computing device to determine vector representations of features based on input sentences including information describing activity that occurs during a session. As described herein, a word embedding model includes an objective function that includes data fields to account for implicit interactions between user profiles and items.

The term "feature vector representation" or "feature vector" refers to a representation in vector space that includes information describing one or more of a user profile identifier, a user profile attribute, an item identifier, data describing an explicit interaction between a user profile and an item, data describing an implicit interaction between a user profile and an item, or combinations thereof. As described herein, feature vector representations describe these various features in a common framework, thereby enabling comparison of feature relationships based on a function of respective feature vectors.

The term "feature similarity matrix" refers to a database structure that mathematically describes relationships between different features. The feature similarity matrix advantageously describes disparate features in a common framework to capture similarities among different features.

The term "cold user profile" refers to a user profile for which the recommendation system is unaware of any data describing previous interactions for the user profile. For example, a cold user profile is contrasted against a warm user profile, for which the recommendation system is aware of data describing historical interactions between the warm user profile and items.

Example Environment

FIG. 1 is an illustration of an environment 100 in an example implementation that is operable to employ feature word embedding for global vector recommendations using the techniques described herein. The illustrated environment 100 includes a service manager system 102, a recommendation system 104, and user interaction with respective computing devices 106, also referred to herein as users, as a source of session data 108 communicated through communication system 110. As described herein, each individual computing device 106 may be associated with multiple user profiles. For instance, a computing device may be shared by a family, with each family member having a respective user profile. Additionally, an individual might use different user profiles for work-related and personal computing device interactions. Thus, a user as described herein refer to an individual user or a profile for an individual user.

The service manager system 102, recommendation system 104, and communication system 110 are implemented at least partially in hardware of one or more computing devices. For instance, each system 102, 104, and 110 may be implemented in computer-readable storage media to be executed by a computing device's processing system. Examples of processing systems and computer-readable storage media are described in further detail below with respect to FIG. 7. In some implementations, the service manager system 102, recommendation system 104, and communication system 110 are implemented at a single computing device. Alternatively or additionally, the service manager system 102, recommendation system 104, and communication system 110 are implemented among multiple computing devices, communicatively connected to one another via the network 112.

A computing device implementing one or more of the systems described herein, for instance, may be configured as a desktop computer, a laptop computer, a mobile device (e.g., assuming a handheld configuration such as a tablet or mobile phone as illustrated), and so forth. Thus, a computing device as referred to herein may range from full resource devices with substantial memory and processor resources (e.g., personal computers, game consoles) to a low-resource device with limited memory and/or processing resources (e.g., mobile devices). Alternatively or additionally, a computing device may refer to a plurality of different devices, such as multiple servers utilized by a business to perform operations "over the cloud" as further described in relation to FIG. 7.

The service manager system 102 is representative of functionality implemented at least partially in hardware of a computing device to provide services accessible via network 112 to the users 106 via respective computing devices. For instance, the service manager system 102 may expose a website 114 or other functionality accessible via the network 112 to expose the items 116. Accordingly, the service manager system 102 is configured to expose items 116 for user interaction.

The communication system 110 is representative of functionality implemented at least partially in hardware of a computing device to enable access to items 116 exposed by the service manager system 102. For instance, the communication system 110 enables access to the service manager system 102 through a web browser, an application, and so forth. In this manner, the communication system 110 enables a computing device to obtain data from the service manager system 102 via network 112. In some implementations, the communication system 110 employs the recommendation system 104 to provide the users 106 with data obtained from the service manager system 102. Alternatively or additionally, the service manager system 102 employs the recommendation system 104 to provide data to the users 106 via the communication system 110.

The recommendation system 104 is representative of functionality implemented at least partially in hardware of a computing device to generate recommendations for users 106 via the communication system 110. In order to generate recommendations, the recommendation system 104 uses a feature similarity matrix 118, which may be stored at storage 120 of a computing device, e.g., a computer-readable storage medium as further described in relation to FIG. 7. The feature similarity matrix 118 is a data structure that is useable by the recommendation system 104 to generate recommendations, which is described in further detail below.

Thus, the service manager system 102, recommendation system 104, and communication system 110, user profile interactions with respective computing devices 106, and the storage 120 are implemented at least partially in hardware of one or more computing devices and may reside on computer-readable storage media to be executed by respective processing systems. Examples of processing systems and computer-readable media can be found in the discussion of the example computing system of FIG. 7.

Figure 2:
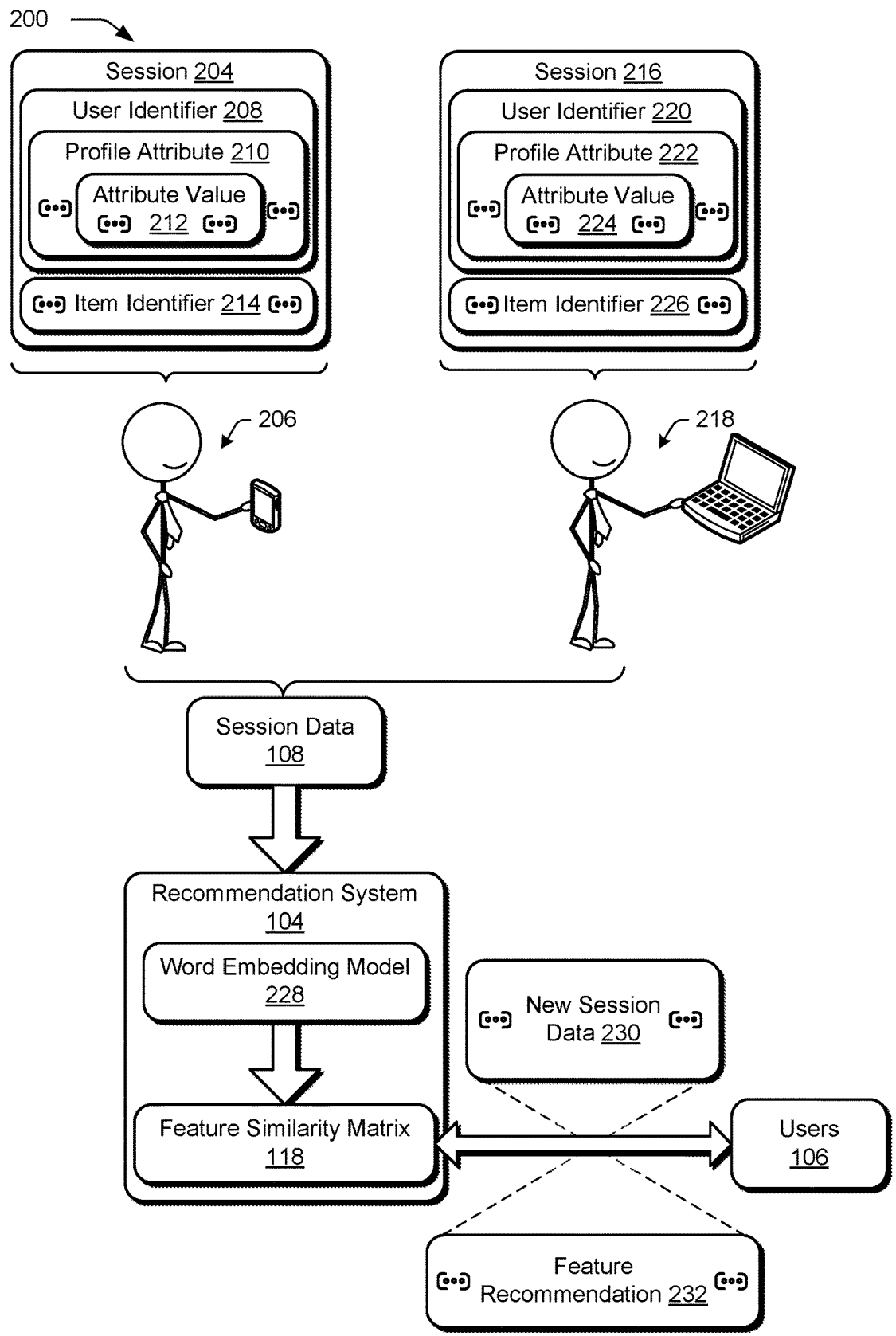
FIG. 2 depicts a system in an example implementation showing operation of a recommendation system of FIG. 1 in greater detail.

FIG. 2 depicts a system 200 in an example implementation showing operation of the recommendation system 104 of FIG. 1 in greater detail. As illustrated, the recommendation system 104 generates the feature similarity matrix 118 based on session data 108. Using the feature similarity matrix 118, the recommendations system 104 then provides feature recommendations 232 to users 106. Session data 108 is received by the recommendation system 104 from respective computing devices implementing user profiles for the users 106. As described herein, session data 108 represents data describing at least one of a user profile identifier, a user profile attribute, an item identifier, or an interaction between a user profile and an item. In some implementations, using the techniques described herein, the interaction described by session data 108 can be an explicit interaction, an implicit interaction, or combinations thereof.

In the illustrated example, session data 108 is received from session 204 for a user profile 206 and from session 216 for a user profile 218. In some implementations, user profile 206 identifies a different individual user than user profile 218. Alternatively, user profiles 206 and 218 may identify a common individual user. For instance, user profile 206 might correspond to a profile for use on an individual's mobile device, while user profile 218 might correspond to a profile for use on the individual's laptop. Thus, the recommendation system 104 is configured to receive session data 108 that describes multiple sessions for one or more user profiles. Received session data 108 may be stored by the recommendations system 104 for further use, such as in storage 120 as illustrated in FIG. 1.

The session data 108 includes, for each session, information that describes at least one of a user profile identifier, a profile attribute and corresponding attribute value, explicit interaction data for an item, implicit interaction data for an item, or combinations thereof. For instance, session 204 includes information describing a user identifier 208 for the user profile 206. The user identifier 208 may be any suitable form of information to uniquely identify a user profile, such as a username, an employee identification number, and so forth.

Session 204 additionally includes information describing at least one profile attribute 210 and a corresponding attribute value 212 for the user profile 206. For instance, an example profile attribute 210 is "city", where the corresponding attribute value 212 might specify "New York". Alternatively or additionally, the profile attribute 210 might be "gender", where the corresponding attribute value 212 specifies "female". Thus, the profile attribute 210 and the attribute value 212 included in session data 108 includes information suitable to identify various descriptive features of the user profile 206. Using the techniques described herein, the profile attribute 210 may include any information suitable to describe the user profile 206, such as a career, discipline, industry, country, region, experience, educational degree, and so forth.

Session 204 further includes at least one item identifier 214, which describes an item with which the user profile 206 has interacted. As described in further detail with respect to FIGS. 3 and 4, the item identifier 214 additionally includes information describing explicit interaction data, implicit interaction data, or combinations thereof for the identified item. For instance, the item identifier 214 may include an item description, an item title, an item metadata tag, search terms associated with the item, and so forth.

Additionally, the item identifier 214 may include information describing explicit and implicit interactions between the user profile 206 and a corresponding item. For instance, the item identifier 214 may include information describing an interaction type, such as a view, a purchase, a timestamp for the interaction, a percentage of an item that was accessed, an amount of time spent interacting with the item, and so forth. Thus, the item identifier 214 not only identifies a particular item with which the user profile 206 interacted, but also includes information describing specifically how the user profile 206 interacted with the particular item.

Likewise, session 216 includes information describing a user identifier 220 for the user profile 218. The user identifier 220 may be any suitable form of information to uniquely identify a user profile, such as a username, an employee identification number, and so forth. Session 216 additionally includes information describing at least one profile attribute 222 and a corresponding attribute value 224 for the user profile 218. For instance, an example profile attribute 222 is "country", where the corresponding attribute value 224 specifies "India".

Alternatively or additionally, the profile attribute 222 might specify "gender", where the corresponding attribute value 224 specifies "male". Thus, the profile attribute 222 and the attribute value 224 included in session data 108 describe information useable to identify various features of the user profile 218. Using the techniques described herein, the profile attribute 222 may include any information suitable to describe the user profile 224, such as a career, discipline, industry, country, region, experience, educational degree, and so forth.

Session 216 additionally includes at least one item identifier 226 that describes an item with which the user profile 218 has interacted. As described in further detail with respect to FIGS. 3 and 4, the item identifier 226 additionally includes information describing explicit interaction data, implicit interaction data, or combinations thereof for the identified item. For instance, the item identifier 226 may include an item description, an item title, an item metadata tag, search terms associated with the item, and so forth.

Additionally, the item identifier 226 may include information describing explicit and implicit interactions between the user profile 218 and a corresponding item. For instance, the item identifier 226 may include information describing an interaction type, such as a view, a purchase, a timestamp for the interaction, a percentage of an item that was accessed, an amount of time spent interacting with the item, and so forth. Thus, the item identifier 226 not only identifies a particular item with which the user profile 218 interacted, but also includes information describing specifically how the user profile 218 interacted with the particular item.

Although item identifiers 214 and 226 are illustrated as included in session data 108, in some implementations the recommendation system 104 is not aware of any item identifiers or item interaction data for a given user profile. For instance, in an example where user profile 206 is a cold user profile, session data 108 for session 204 may only include the user identifier, the profile attribute 210 and the attribute value 212, or combinations thereof. However, even without receiving information corresponding to the item identifier 214, the recommendation system can still generate a feature recommendation 232 for the user profile 206 using the feature similarity matrix 118.

In order to generate the feature similarity matrix 118, the recommendation system 104 applies a word embedding model 228 to the session data 108. The word embedding model 228 is configured to implement natural language processing to produce feature vector representations for the various information included in the session data 108. The word embedding model 228 may be configured in a variety of manners, such as a modified Global Vectors for word representation model, which is discussed in further detail below in relation to FIGS. 3 and 4. From the feature vector representations, the recommendation system generates the feature similarity matrix 118. In implementations, generation of the feature similarity matrix 118 is performed using feature vector representation dot product comparison, feature vector representation arithmetic, and so forth.

The recommendation system 104 is configured to provide feature recommendations 232 based on new session data 230. New session data 230 is representative of information describing a session for a user profile that was not previously described in session data 108 used to generate the feature similarity matrix 118. For instance, new session data 230 may include information describing a user identifier for a user profile. Alternatively or additionally, the new session data 230 may include information describing a profile attribute for the user profile and a corresponding attribute value for the profile attribute. Alternatively or additionally, the new session data 230 may include information describing an item and an interaction between the item and the user profile during the session.

For instance, if new session data 230 describes that a user profile is currently viewing item "A", the recommendation system 104 is configured to employ the feature similarity matrix 118 to identify a similar item based on the item's features to output a feature recommendation 232 for the similar item. Likewise, the recommendation system 104 is configured to employ the feature similarity matrix 118 to identify items with an affinity to a user profile based on a user profile identifier or a user profile attribute value.

Because the feature similarity matrix 118 includes information describing user profile identifiers, user profile attribute values, item identifiers, and item interaction data, user profile item affinities can be determined using any suitable feature to generate feature recommendations 232. This enables the recommendation system 104 to customize feature recommendations 232 for even a cold user profile that is not associated with any item interaction information describing previous sessions for the cold user profile. For instance, the recommendation system 104 may identify that the user profile corresponds to Las Vegas and identify items having affinity to Las Vegas affiliated user profiles using the feature similarity matrix 118 to include in feature recommendation 232.

In implementations where there the feature similarity matrix 118 does not identify a similar item to include in the feature recommendation 232 for new session data 230, the recommendation system 104 may provide a generic feature recommendation 232 or abstain from providing a feature recommendation 232.

Conversely, in scenarios where recommendations system 104 identifies multiple similar items, the recommendation system 104 applies a weighting function to identify items from the feature similarity matrix 118 that are most similar to the new session data 230 for inclusion in the feature recommendations 232. Additional factors such as item ratings, item tags, and so forth can additionally be used by the recommendation system 104 to determine an order of feature recommendations 232 for delivery to a user profile.

Figure 3:
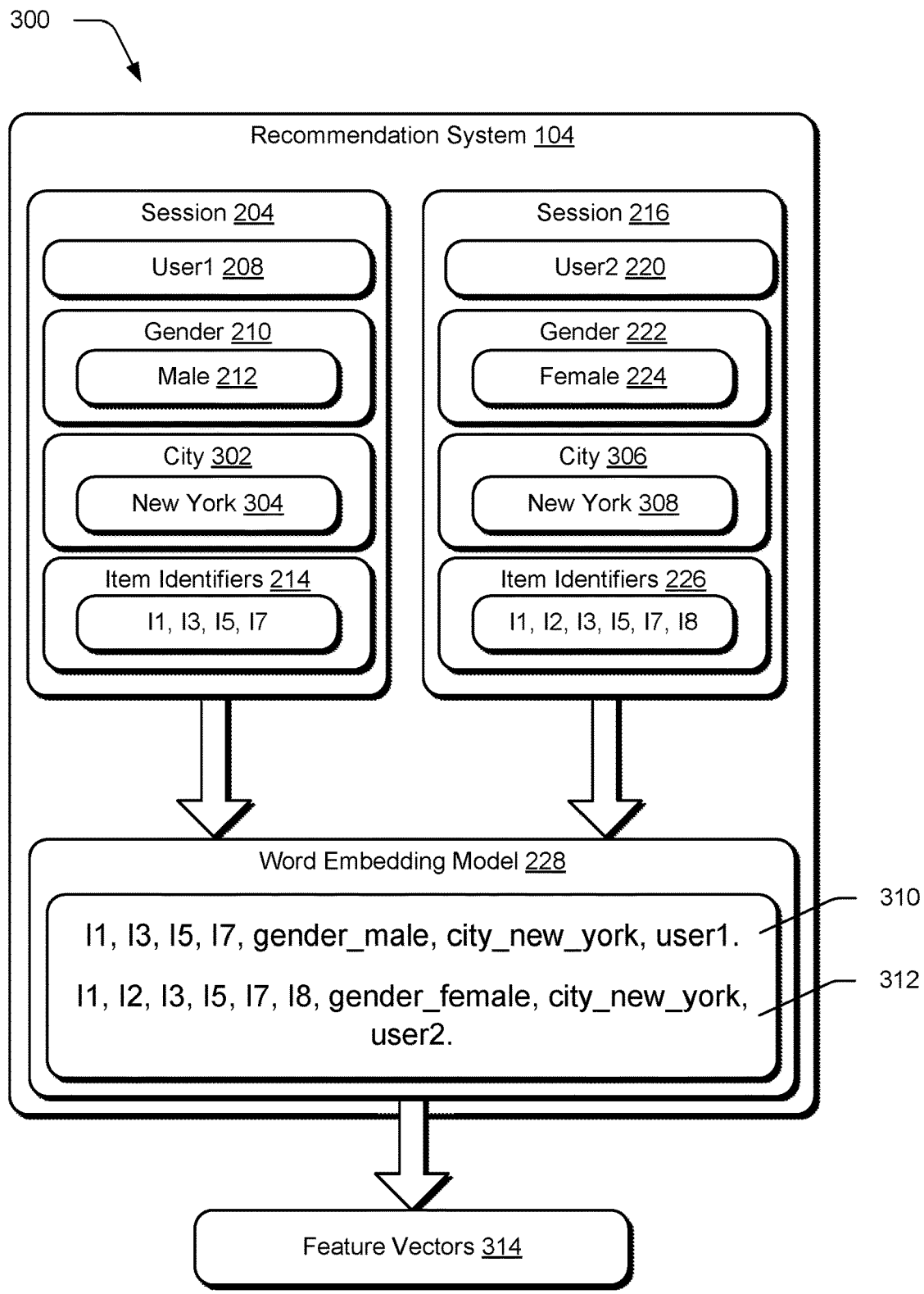
FIG. 3 depicts an example implementation showing feature vector generation using word embedding.

FIG. 3 depicts an example implementation 300 showing feature vectors 314 generated by the recommendation system 104 based on applying the word embedding model 228 of FIG. 2 to session data. In the illustrated example, session data is represented as describing sessions 204 and 216, as illustrated in FIG. 2. In the present example, session 204 includes information describing a user profile identifier 208, which specifies that session 204 corresponds to "User1". Similarly, session 204 includes information describing a gender profile attribute 210, which specifies that the user profile for session 204 corresponds to a "male" gender. Session 204 additionally includes a city profile attribute 302, which specifies that the user profile for session 204 corresponds to "New York" city. Finally, session 204 includes item identifiers 214, which indicate that the user profile interacted with items "I1, I3, I5, and I7" during the session.

Although not illustrated, item identifiers 214 may additionally include information describing interaction information between the user profile and individual ones of items I1, I3, I5, and I7 for session 204. For instance, information specified by item identifiers 214 may indicate that item I3 was viewed multiple times, that item I5 was purchased, that only 15% of item I7 was displayed by a computing device for the user profile, and so forth. Thus, the information specified by item identifiers 214 can describe specifically how a user profile interacted with various items during the session 204, both implicitly and explicitly. An additional discussion of interaction information specified by session data is included below with respect to FIG. 4.

In the illustrated example, session 216 includes information describing a user profile identifier 220, which specifies that session 216 corresponds to "User2". Similarly, session 216 includes information describing a gender profile attribute 222, which specifies that the user profile for session 216 corresponds to a "female" gender. Session 216 additionally includes a city profile attribute 306, which specifies that the user profile for session 216 corresponds to "New York" city. Finally, session 216 includes item identifiers 226, which indicate that the user profile interacted with items "I1, I2, I3, I5, I7, and I8" during the session.

Although not illustrated, item identifiers 226 may additionally include information describing interaction information between the user profile and individual ones of items I1, I2, I3, I5, I7, and I8 for session 216. For instance, information specified by item identifiers 226 may indicate that item I2 was viewed multiple times, that item I1 was purchased, that 100% of item I7 was displayed by a computing device for the user profile, and so forth. Thus, the information specified by item identifiers 226 can describe specifically how a user profile interacted with various items during the session 216, both implicitly and explicitly.

The session data from sessions 204 and 216 is then fed to the word embedding model 228 to generate feature vectors 314. As described herein, the word embedding model 228 characterizes individual aspects of session data as words and combines the various words to form a sentence that is descriptive of the respective sessions 204 and 216. For instance, the word embedding model 228 generates sentence 310 from session 204. In the illustrated example, sentence 310 includes the individual words "I1", "I3", "I5", "I7", "gender_male", "city_new_york", and "user1", which succinctly describes session data for session 204. Similarly, sentence 312 includes the individual words "I1", "I2", "I3", "I5", "I7", "I8", "gender_female", "city_new_york", and "user2", which succinctly describes session data for session 216.

From these sentences, feature vectors 314 can be generated for each different word included in a sentence generated by word embedding model 228. For instance, a feature vector for "city_new_york" can be generated to describe items that have an affinity to user profiles associated with New York City. In this manner, the feature vectors 314 can be used to identify item affinities for user profiles that are not associated with any previous explicit or implicit interaction data. In order to account for implicit interaction data, the recommendation system 104 is configured to generate multiple sentences for a single session.

Figure 4:
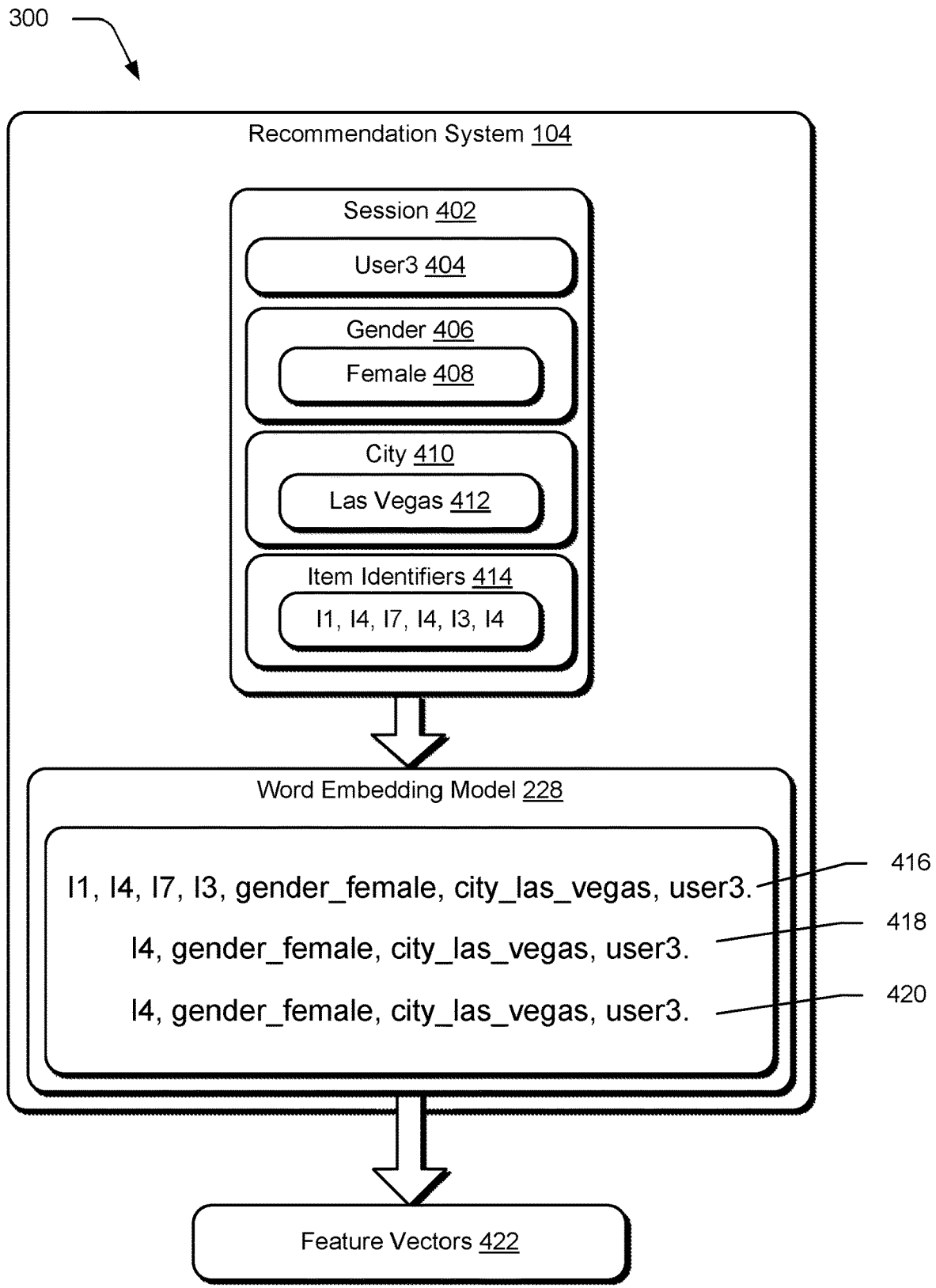
FIG. 4 depicts an example implementation showing feature vector generation using word embedding.

FIG. 4 depicts an example implementation 400 showing feature vectors 422 generated by the recommendation system based on applying the word embedding model 228 of FIG. 2 to session data. In the illustrated example, session data is represented as describing session 402. Session 402 includes information describing a user profile identifier 404, which specifies that session 402 corresponds to "User3". Similarly, session 402 includes information describing a gender profile attribute 406, which specifies that the user profile for session 402 corresponds to a "female" gender. Session 402 additionally includes a city profile attribute 410, which specifies that the user profile for session 402 corresponds to the city of "Las Vegas". Finally, session 402 includes item identifiers 414, which indicate that the user profile interacted with items "I1, I4, I7, and I3".

The information specified by item identifiers 414 is illustrated as including interaction information describing interactions between the respective items and the user profile for session 402. For instance, item identifiers include three separate listings of item "I4". In some implementations, this may indicate that that the user profile viewed item I4 three separate times during session 402, while items I1, I3, and I7 were each only viewed once during session 402. Although described herein in terms of a number of views, interaction information included in item identifiers 414 may include any type of information describing explicit or implicit interactions between a user profile and an item. For instance, item identifiers 414 may specify a number of item segments consumed by a computing device, an amount of time spent interacting with a certain item, and so forth. Thus, information included in the item identifiers 414 describes specifically how a user profile interacted with various items during the session 404.

The recommendation system 104 then applies the word embedding model 228 to session data from session 402 in order to generate feature vectors 422. As described herein, the word embedding model 228 characterizes individual aspects of session data as words and combines the various words to form sentences that are descriptive of session 402. For instance, the recommendation system 104 may generate separate sentences for explicit interaction data and implicit interaction data. In the illustrated example, sentences 416, 418, and 420 are generated from a single session to account for implicit interaction data pertaining to item I4. Sentence 416 includes the individual words "I1", "I4", "I7", "I3", "gender_female", "city_las_vegas", and "user3", which describes explicit interactions between items and the user profile corresponding to user3. Conversely, sentences 418 and 420 include the individual words "I4", "gender_female", "city_las_vegas", and "user3".

Thus, sentences 418 and 420 represent implicit interaction data, such as viewing item I4 more frequently than items I1, I3, and I7 during session 402. In this manner, the recommendation system 104 is configured to account for implicit interaction data that would otherwise not be communicated by generating a single sentence for a session. From sentences generated by recommendation system 104, an affinity between various features, such as an item and user profile attribute, can be determined as a function of their respective feature vectors 422. In order to account for this implicit interaction data, the word embedding model 228 implements a modified objective function.

The word embedding model 228 is representative of a modified Global Vectors (GloVe) model, which is a global log-bilinear regression model configured to use a word-to-word co-occurrence matrix along with local context windows to generate word embeddings in a low-dimensional space. These word embeddings are then useable by a computing device implementing recommendation system 104 to produce feature vector representations of associated items, profile attribute values, interaction data, and so forth. Although described herein in terms of using a word-to-word co-occurrence matrix where session data is represented as words or a sentence, an item-item co-occurrence matrix can also be used to directly generate item embeddings in the low-dimensional space.

The word embedding model 228 is thus configured to implement a modified GloVe model and leverage statistical information by training only on non-zero elements of the word-to-word co-occurrence matrix. By training only on the non-zero elements, rather than on an entire sparse matrix of individual context windows over a large corpus, the word embedding model 228 is configured to rapidly generate feature vectors 314 for use in providing recommendations in real-time for a current state of a user profile. The representation deduction process employed by the word embedding model 228 regards the distance between words as representative of similarity, or an affinity between words. For instance, items interacted with consecutively in a single session are likely to be more similar than items that are interacted with over disparate, non-contiguous sessions. In addition to capturing this item session similarity, the word embedding model 228 is configured to account for implicit interactions between an item and a user profile using a modified objective function for the GloVe model, represented by Equation 1:

$$J = \sum_{i=1}^{V} \sum_{j=1}^{V} f(X_{ij} + \alpha C_{ij})(\vec{w}_i^T \vec{w}_j + b_i + b_j - \log(X_{ij} + \alpha C_{ij}))^2 \quad (\text{Eq. 1})$$

In Equation 1, $C_{ij}$ represents the feature similarity matrix 118, which contains session data 108 where each row may correspond to a user profile attribute and each column to an item. Alternatively or additionally, rows may correspond to items and columns may correspond to user profiles, or combinations thereof. In this manner, the modified objective function of Equation 1 is able to account for implicit interaction data that describes implied affinities between items and user profiles. Equation 1 additionally includes a confidence factor, $\alpha$, which represents a degree of confidence in the value of implicit user profile and item affinities. For instance, the higher the value of $\alpha$, a greater amount of weight will be given to implicit user profile affinities. In some implementations, $\alpha$ represents a value of 0.1. However, any suitable value between 0 and 1 may be used in Equation 1.

Thus, the recommendation system 104 generates feature vectors 314 that include information describing a user profile identifier, a user profile attribute value, an item identifier, explicit interactions between the user profile and the item, implicit interactions between the user profile and the item, or combinations thereof. In this manner, the feature vectors 314 are useable to identify items that are similar to a user profile even if there is no prior interaction data stored for that user profile, enabling the recommendation system 104 to generate customized feature recommendations even for cold users. Although described as identifying items that are likely of interest to a user profile, the techniques described herein are similarly useable to identify user profiles that are likely to have an affinity for a certain item based on information describing the certain item. Further, because the recommendation system 104 embeds user profiles, items, and user profile attributes in a single vector space, it is employable across different domains to provide customized recommendations in real-time.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
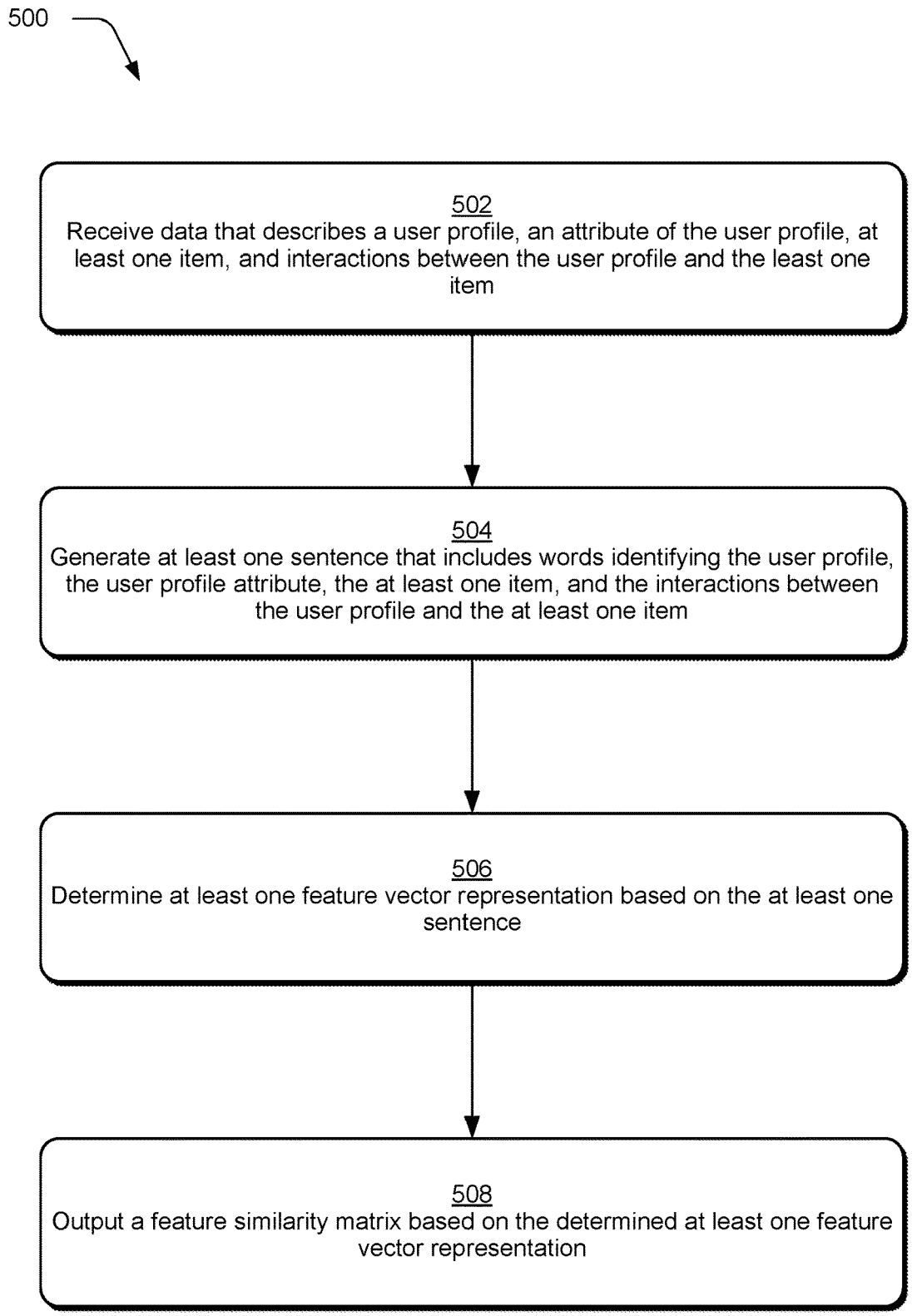
FIG. 5 is a flow diagram depicting an example procedure in accordance with one or more embodiments.

FIG. 5 depicts a procedure 500 in an example implementation of feature word embedding for global vector recommendations. Data that describes a user profile, an attribute of the user profile, an item, and interactions between the user profile and the item is received (block 502). The computing device implementing the recommendation system 104, for instance, receives session data 108 from communication system 110. The received data is organized by the recommendation system into individual sessions for respective user profiles, as described herein and illustrated in FIGS. 2-4. In some implementations, the session data may include information describing the user profile, the user profile attribute, the item, or the interactions between the user profile and the item, or combinations thereof. For instance, the received session data may describe that the user profile corresponds to a "user3", that a gender attribute for the user profile is "female", that a city attribute for the user profile is "Las Vegas", and that the user profile interacted with items "I1, I4, I7, and I3".

In response to receiving the session data, at least one sentence is generated that includes words identifying the user profile, the user profile attribute, the item, and the interactions between the user profile and the item (block 504). For instance, a first sentence may be generated from the example received session data that reads as "I1, I4, I7, I3, gender_female, city_las_vegas, user3." In some implementations, this sentence represents a word embedded description of explicit interaction data for a particular session. Additionally, second and third sentences can be generated from the example received session data to read as "I4, gender_female, city_las_vegas, user3." In this example, the second and third sentences represent implicit interaction data that would otherwise not be quantified by conventional techniques that simply describe item-item session correspondence. Additionally, each generated sentence includes features describing a user profile as well as items and corresponding interactions for a single sentence. Thus, the sentences generated by recommendation system 104 are useable to identify feature similarity across disparate feature categories.

Subsequently, at least one feature vector representation is determined based on the at least one generated sentence (block 506). In implementations, the feature vector representation is generated by a word embedding model, such as word embedding model 228 of the recommendation system 104. For instance, the word embedding model 228 may implement a GloVe model with a modified objective function, as described above with respect to Equation 1. In this manner, the feature vector representations include information describing a user profile, an item, and corresponding explicit and implicit interactions between the user profile and the item.

Finally, a feature similarity matrix is output based on the at least one feature vector representation (block 508). In implementations, the feature similarity matrix 118 is output by the recommendation system 104 based on a function of the determined feature vector representations, such as feature vectors 314 and 422, as illustrated in FIGS. 3 and 4. For instance, dot products of feature vectors can be computed to determine feature similarity among various features described in the feature similarity matrix 118. In this manner, features having higher dot product values from their respective feature vectors are associated with a higher degree of similarity than those having lower dot product values.

Thus, the feature similarity matrix and corresponding feature vector representations can be stored for subsequent access, such as in a lookup table of storage 120 of FIG. 1. Alternatively or additionally, the feature vector representations and feature similarity matrix can be indexed into a search engine for real-time delivery of customized recommendations in a distributed computing environment, even for cold user profiles.

Figure 6:
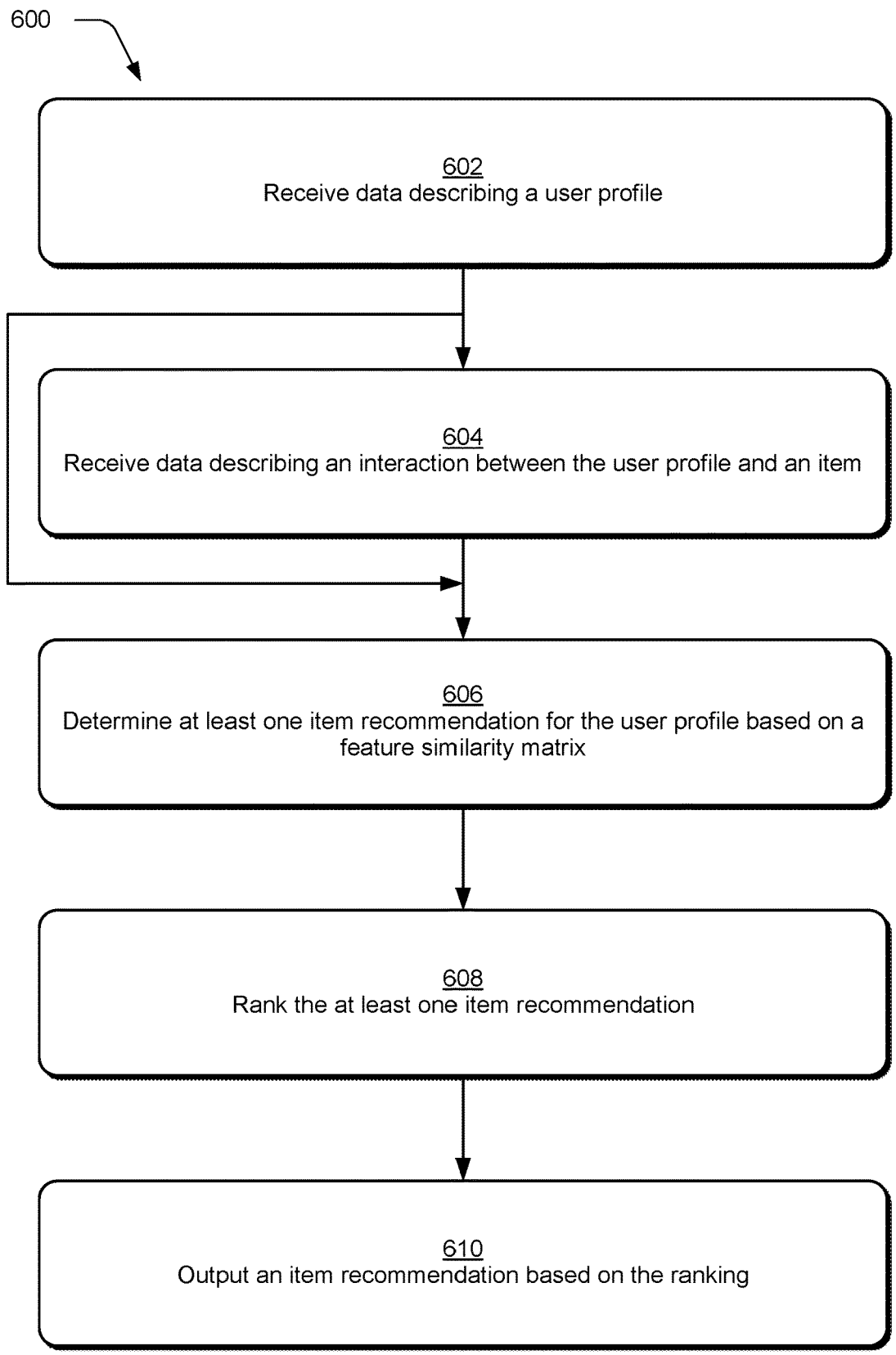
FIG. 6 is a flow diagram depicting an example procedure in accordance with one or more embodiments.

FIG. 6 depicts a procedure 600 in an example implementation of feature word embedding for global vector recommendations. Data describing a user profile is received (block 602). The computing device implementing the recommendation system 104, for instance, receives new session data 230 via network 112 describing a user profile for a session. For instance, the received data may describe an identifier for the user profile or at least one user profile attribute value, or combinations thereof. In some implementations, data describing the user profile is received by the recommendation system 104 via network 112 as part of a query for a website 114 or items 116 from the service manager system 102, as illustrated in FIG. 1.

Data describing an interaction between the user profile and an item is also received (block 604). This data describing the interaction between the user profile and the item is optionally received, as indicated by the arrow circumventing block 604. For instance, in the case of a cold user profile, no data describing interactions between the cold user profile and an item are available, and thus not received by the recommendation system 104. Data describing the interaction, for instance, may be received as part of the new session data 230 by the recommendation system 104 via network 112.

Alternatively or additionally, data describing the interaction may be received from storage 120, as illustrated in FIG. 1. In implementations, data describing the interaction between the user profile and the item may refer to historical interaction from previous sessions between the user profile and the item. Additionally or alternatively, data describing the interaction between the user profile and the item may refer to an item being accessed by the user profile during an ongoing session. Thus, the recommendation system 104 is configured to provide recommendations in real-time that reflect a current state of a user profile.

In response to receiving data describing the user profile and optionally receiving data describing the interaction between the user profile and an item, at least one item recommendation for the user profile is determined based on a feature similarity matrix (block 606). For instance, the recommendation system 104 may employ the feature similarity matrix 118 to generate a feature recommendation 232 for a user profile based on new session data 230. The feature similarity matrix 118 may be generated by the recommendation system 104 using the techniques described herein with respect to FIGS. 1-5.

In response to determining multiple item recommendations for the user profile based on the feature similarity matrix, the item recommendations are ranked (block 608). Rankings for multiple recommendations may be determined by the recommendation system 104 using any suitable metric. For instance, multiple feature recommendations 232 may be ranked based upon timestamps corresponding to interactions between user profiles and items, based on explicit interaction data such as item rankings, or based on implicit interaction data such as an amount of time spent interacting with an item, and so forth. In some implementations, the recommendation system 104 performs this ranking by adjusting an alpha value used in the modified objective function described with respect to Equation 1. In situations where only a single item recommendation is generated by the recommendation system 104, the single item recommendation is treated as the top-ranked recommendation.

In response to ranking the recommendations, an item recommendation is output based on the ranking (block 610). For instance, the recommendation system 104 can communicate one or more feature recommendations 232 to the communication system 110 via network 112 for output at a computing device corresponding to one of the user profiles 106. In this manner, the recommendation system 104 is configured to generate recommendations in real-time based on vector representations that describe user profiles, user profile attributes, items, explicit interactions, and implicit interactions in a common framework.

Thus, the recommendation system 104 is configured to output recommendations based on a function of vector representations that describe features representing user profiles, items, and corresponding interactions. By describing explicit interactions, implicit interactions, and user profile attributes in a common framework, the recommendation system 104 can output customized recommendations for a cold user profile that has not previously interfaced with the recommendation system 104, such that different cold user profiles receive different recommendations. Furthermore, the recommendation system 104 accounts for additional features otherwise ignored by conventional recommendation techniques, thereby providing recommendations with high degrees of affinity for a given user profile.

Example System and Device

Figure 7:
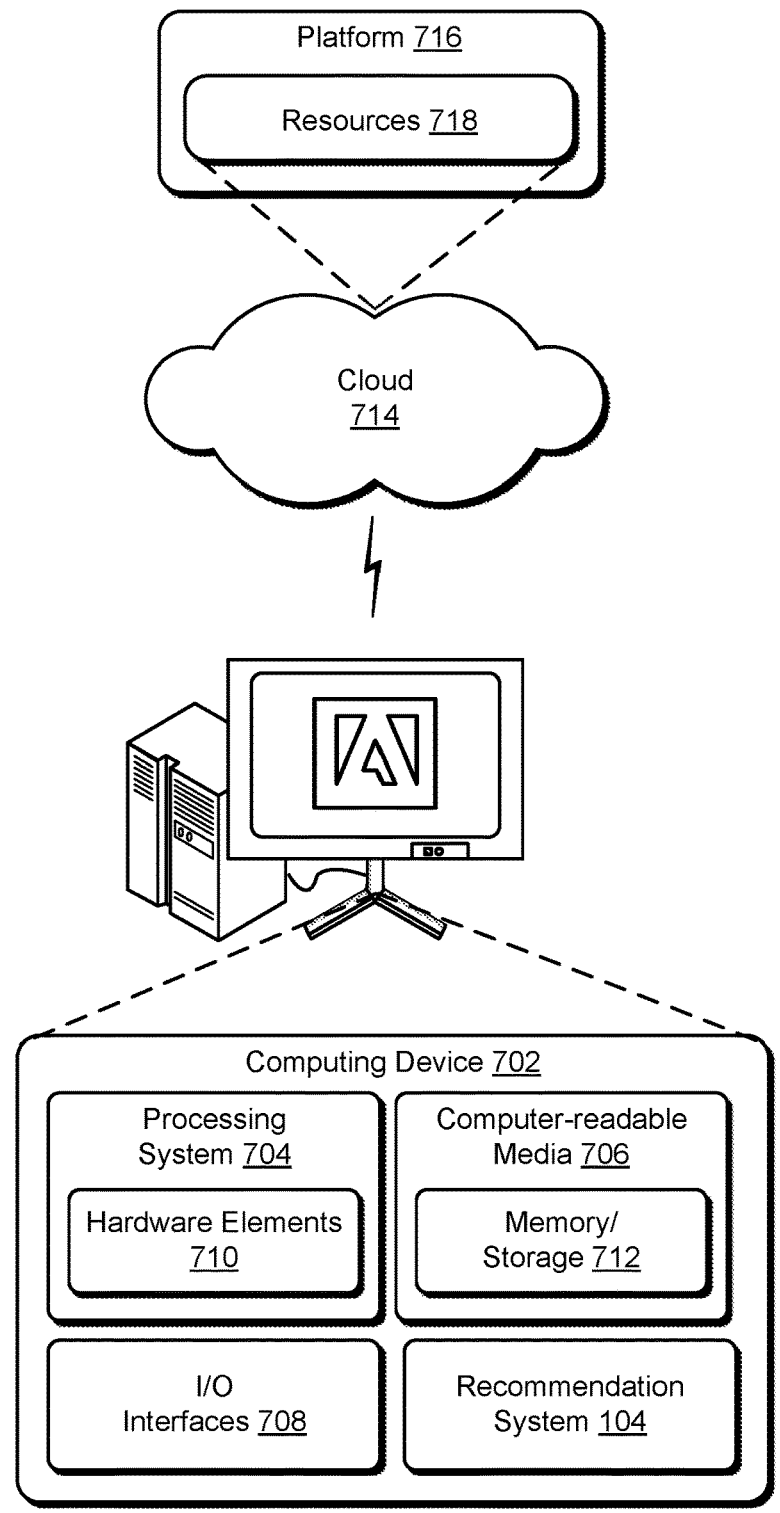
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the recommendation system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described systems, modules, and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to provide recommendations based on feature vector representations, a method implemented by at least one computing device, the method comprising:
   receiving, by the at least one computing device, session data for multiple sessions, the session data for each of the multiple sessions including data that describes at least one attribute for a user profile, at least one item, and at least one interaction between the user profile and the at least one item during the session;
   defining, by the at least one computing device, each of the multiple sessions as a sentence that includes a plurality of words, each of the plurality of words corresponding to one of the at least one attribute for the user profile, the at least one item, or the at least one interaction between the user profile and the at least one item;
   determining, by the at least one computing device, feature vector representations for the at least one attribute, the at least one item, and the at least one interaction represented as words in the multiple sentences and generating a feature similarity matrix from the feature vector representations;
   receiving, by the at least one computing device, data describing a cold user profile that requests access to an item;
   generating, by the at least one computing device, an item recommendation for the cold user profile using the data describing the cold user profile and the feature similarity matrix; and
   outputting, by the at least one computing device, the item recommendation.

2. The method as described in claim 1, wherein the feature vector representations are determined based on a word embedding model that includes a global log-bilinear regression model configured to use a word-to-word co-occurrence matrix and local context windows to generate word embeddings.

3. The method as described in claim 2, wherein the word embedding model includes an objective function that includes fields for data describing implicit interactions between an item and a user profile.

4. The method as described in claim 1, wherein generating the feature similarity matrix includes computing dot products of the feature vector representations, the dot products being usable to determine similarities between different features.

5. The method as described in claim 4, wherein the different features include a feature describing a user profile attribute and a feature describing an item.

6. The method as described in claim 1, wherein the at least one attribute for the user profile describes one or more of an identifier for the user profile, a city associated with the user profile, a gender associated with the user profile, a career associated with the user profile, an industry associated with the user profile, a country associated with the user profile, or an educational degree associated with the user profile.

7. The method as described in claim 1, wherein defining each of the multiple sessions as a sentence comprises associating each of the at least one attribute for the user profile, the at least one item, and the interaction between the user profile and the at least one item with one of the plurality of words using natural language processing.

8. The method as described in claim 1, further comprising receiving, by the at least one computing device, data describing a subsequent interaction between the cold user profile and an item and generating an additional item recommendation based on the, feature similarity matrix and the data describing the subsequent interaction between the cold user profile and the item.

9. In a digital medium environment to receive recommendations based on feature vector representations, a method implemented by at least one computing device, the method comprising:

sending, by the at least one computing device, data describing at least one user profile attribute with a request for at least one item;

receiving, by the at least one computing device, the at least one item, the at least one item being identified based on the at least one user profile attribute and a feature similarity matrix that is generated based on a plurality of feature vector representations, each of the plurality of feature vector representations generated based on a sentence of words, each of the words representing a user profile identifier, a user profile attribute, an item, or an interaction between the user profile and the item; and outputting, by the at least one computing device, the at least one item.

10. The method as described in claim 9, wherein a first the at least one of the sentence of words describes explicit interactions between the user profile and the item and a second one of the sentence of words describes implicit interactions between the user profile and the item.

11. The method as described in claim 10, wherein the explicit interactions between the user profile and the item comprise one or more of a purchase of the item or a rating assigned to the item.

12. The method as described in claim 10, wherein the implicit interactions between the user profile and the item comprise one or more of a number of views for the item during a session, an amount of interaction time between the user profile and the item, or an access percentage of the items accessed item by the user profile.

13. The method as described in claim 9, wherein each of the feature vector representations are determined by applying a word embedding model to the corresponding sentence of words.

14. The method as described in claim 13, wherein the word embedding model includes an objective function that includes fields for data describing implicit interactions between an item and a user profile.

15. In a digital medium environment to facilitate recommendations based on feature vector representations, a system comprising:

at least one processor; and at least one module implemented at least partially in hardware of a computing device and operable to provide a recommendation by performing operations including:

receiving session data for multiple sessions, the session data for each of the multiple sessions including data describing at least one attribute for a user profile, at least one item, and at least one interaction between the user profile and the at least one item during the session;

defining each of the multiple sessions as a sentence that includes a plurality of words, each of the plurality of words corresponding to one of the at least one attribute for the user profile, the at least one item, or the at least one interaction between the user profile and the at least one item;

determining feature vector representations for the at least one attribute, the at least one item, and the at least one interaction represented as words in the multiple sentences and generating a feature similarity matrix from the feature vector representations;

receiving data describing a cold user profile that is different from the multiple user profiles;

determining at least one item recommendation for the cold user profile based on the data describing the cold user profile and the feature similarity matrix; and outputting the at least one item recommendation to the cold user profile.

16. The system as described in claim 15, wherein the data describing the cold user profile includes at least one of an identifier for the cold user profile or an attribute describing characteristics of the cold user profile.

17. The system as described in claim 15, wherein the data describing the cold user profile does not include information describing an interaction between the cold user profile and an item.

18. The system as described in claim 15, wherein the feature vector representations are determined using a word embedding model that includes a global log-bilinear regression model configured to use a word-to-word co-occurrence matrix and local context windows to generate word embeddings.

19. The system as described in claim 15, wherein generating the feature similarity matrix includes computing dot products of the feature vector representations, the dot products being useable to determine similarities between different features.

20. The system as described in claim 15, wherein defining each of the multiple sessions as a sentence comprises associating each of the at least one attribute for the user profile, the at least one item, and the interaction between the user profile and the at least one item with one of the plurality of words using natural language processing.

* * * * *

UNITED STATES PATENT AND TRADEMARK OFFICE
CERTIFICATE OF CORRECTION

PATENT NO. : 10,699,321 B2
APPLICATION NO. : 15/785934
DATED : June 30, 2020
INVENTOR(S) : Balaji Krishnamurthy and Nikaash Puri Page 1 of 1

It is certified that error appears in the above-identified patent and that said Letters Patent is hereby corrected as shown below:

In the Claims

Column 19, Line 30, delete "items accessed", therefor.

Signed and Sealed this
Eighth Day of September, 2020

Andrei Iancu
*Director of the United States Patent and Trademark Office*